United States Patent
Kim et al.

(10) Patent No.: US 7,299,340 B2
(45) Date of Patent: Nov. 20, 2007

(54) DATA PROCESSING DEVICE HAVING SELECTIVE DATA CACHE ARCHITECTURE AND COMPUTER SYSTEM INCLUDING THE SAME

(75) Inventors: Yun-Hwan Kim, Yongin-shi (KR); Joong-Eon Lee, Sungnam-shi (KR); Kyoung-Mook Lim, Yongin-shi (KR)

(73) Assignee: Samsung Electronics., Ltd., Suwon-si (KR)

( * ) Notice: Subject to any disclaimer, the term of this patent is extended or adjusted under 35 U.S.C. 154(b) by 320 days.

(21) Appl. No.: 10/774,775

(22) Filed: Feb. 9, 2004

(65) Prior Publication Data

US 2004/0162944 A1    Aug. 19, 2004

(30) Foreign Application Priority Data

Feb. 12, 2003    (KR)    ............... 10-2003-0008795

(51) Int. Cl.
*G06F 9/28*    (2006.01)

(52) U.S. Cl. ............... 712/35; 712/34; 711/130; 711/120; 711/119

(58) Field of Classification Search ............... None
See application file for complete search history.

(56) References Cited

U.S. PATENT DOCUMENTS

| | | | | |
|---|---|---|---|---|
| 5,686,960 | A * | 11/1997 | Sussman et al. | 348/218.1 |
| 6,170,049 | B1 * | 1/2001 | So | 712/35 |
| 6,279,489 | B1 * | 8/2001 | Daniel | 108/92 |
| 6,369,855 | B1 * | 4/2002 | Chauvel et al. | 348/423.1 |
| 2004/0160637 | A1 * | 8/2004 | Tuli | 358/1.15 |

* cited by examiner

*Primary Examiner*—B. James Peikari
(74) *Attorney, Agent, or Firm*—F. Chau & Associates, LLC

(57) ABSTRACT

The disclosure is a data processing device with selective data cache architecture and a computer system including the data processing device. The data processing device is comprised of a microprocessor, a coprocessor, a microprocessor data cache, an X-data cache, and a Y-data cache. The microprocessor fetches and executes instructions, and the coprocessor carries out digital signal processing functions. The microprocessor data cache stores data provided from the microprocessor. The X-data cache stores a first group of data provided from the coprocessor while the Y-data cache stores a second group of data provided from the coprocessor.

25 Claims, 3 Drawing Sheets

DATA PROCESSING DEVICE HAVING SELECTIVE DATA CACHE ARCHITECTURE AND COMPUTER SYSTEM INCLUDING THE SAME

BACKGROUND OF THE INVENTION

1. Field of the Invention

The present invention generally relates to computer systems and, more specifically, to a data processing device with selective data cache architecture in a computer system.

2. Discussion of Related Art

Computer systems perform various functions with sophisticated processors at high speed. The efficiencies in the computer systems are associated with the performance of memories embedded therein. Cache memories employed in the computer systems contribute to managing program information and need to be operable at higher speeds in order to enhance overall performance of the computer systems.

Multiple kinds of cache memories have been proposed with various functional structures to improve performance in correspondence with arising needs of various and complicated functions in computer systems. These cache memories include, for example, cache memories independently assigned to instructions and data, parallel cache memories for accelerating memory access times, and different-sized cache memories with hierarchical structures. Such cache memories typically operate with processing units or execution parts to access other caches.

The trends in constructing the computer systems are rapidly going to system-on-chip (SOC) architecture in which system components, such as processors, cache memories, peripheral devices, and bus interface units, are integrated as a single chip. The SOC architecture is regarded as a small computer system. Typically SOC's have two or more built-in processors: one microprocessor controls overall operations thereof; another microprocessor is a coprocessor, e.g., DSP (digital signal processor) for managing data processing operations. The DSP carries out data multiplication and accumulation, read and write operations for one or more memories, and operations for incrementing address pointer registers.

The microprocessor and the DSP independently access cache memories separately assigned to them according to address locations of external memory data. Such a separate cache system may increase the whole cache memory capacity and the occupation area in the SOC.

SUMMARY OF THE INVENTION

A data processing device manages an efficient cache memory capacity.

A data processing device is capable of being efficiently operable with cache memories in a small chip area.

A computer system comprises a data processing device occupying a small circuit area, wherein the computer system manages an efficient cache memory capacity.

According to an embodiment of the present invention, a data processing device comprises a microprocessor (MCU) for fetching and executing an instruction, a coprocessor for storing data managed by the microprocessor, and an MCU data cache for storing data managed by the microprocessor. The data processing device further comprising an X-data cache for storing a first data group managed by the coprocessor, and a Y-data cache for storing a second data group managed by the coprocessor.

The data processing device further comprises an MCU data cache for storing data managed by the microprocessor.

According to an embodiment of the present invention, a computer system comprises a system bus, a host processor for receiving, decoding, and executing instructions, an arbiter for controlling priorities for accessing the system bus, a data processing unit for performing digital signal processing operations subject to the host processor, and an external memory for storing data managed by the data processing unit. The data processing unit comprises a microprocessor (MCU) for fetching and executing an instruction, a coprocessor for storing data managed by the microprocessor, an X-data cache for storing a first data group managed by the coprocessor, and a Y-data cache for storing a second data group managed by the coprocessor. The computer system of the invention further comprises an MCU data cache for storing data managed by the microprocessor.

The present invention will be better understood from the following detailed description of exemplary embodiments thereof taken in conjunction with the accompanying drawings, and its scope will be pointed out in the appended claims.

BRIEF DESCRIPTION OF THE DRAWINGS

In the accompanying drawings in like reference characters refer to the same parts throughout the different views. The drawings are not necessarily to scale, emphasis is instead being placed upon illustrating principles of the invention.

DETAILED DESCRIPTION OF PREFERRED EMBODIMENTS

It should be understood that the description of preferred embodiments is merely illustrative and that it should not be taken in a limiting sense. In the following detailed description, several specific details are set forth in order to provide a thorough understanding of the present invention. It will be obvious, however, to one skilled in the art that the present invention may be practiced without these specific details.

Figure 1:
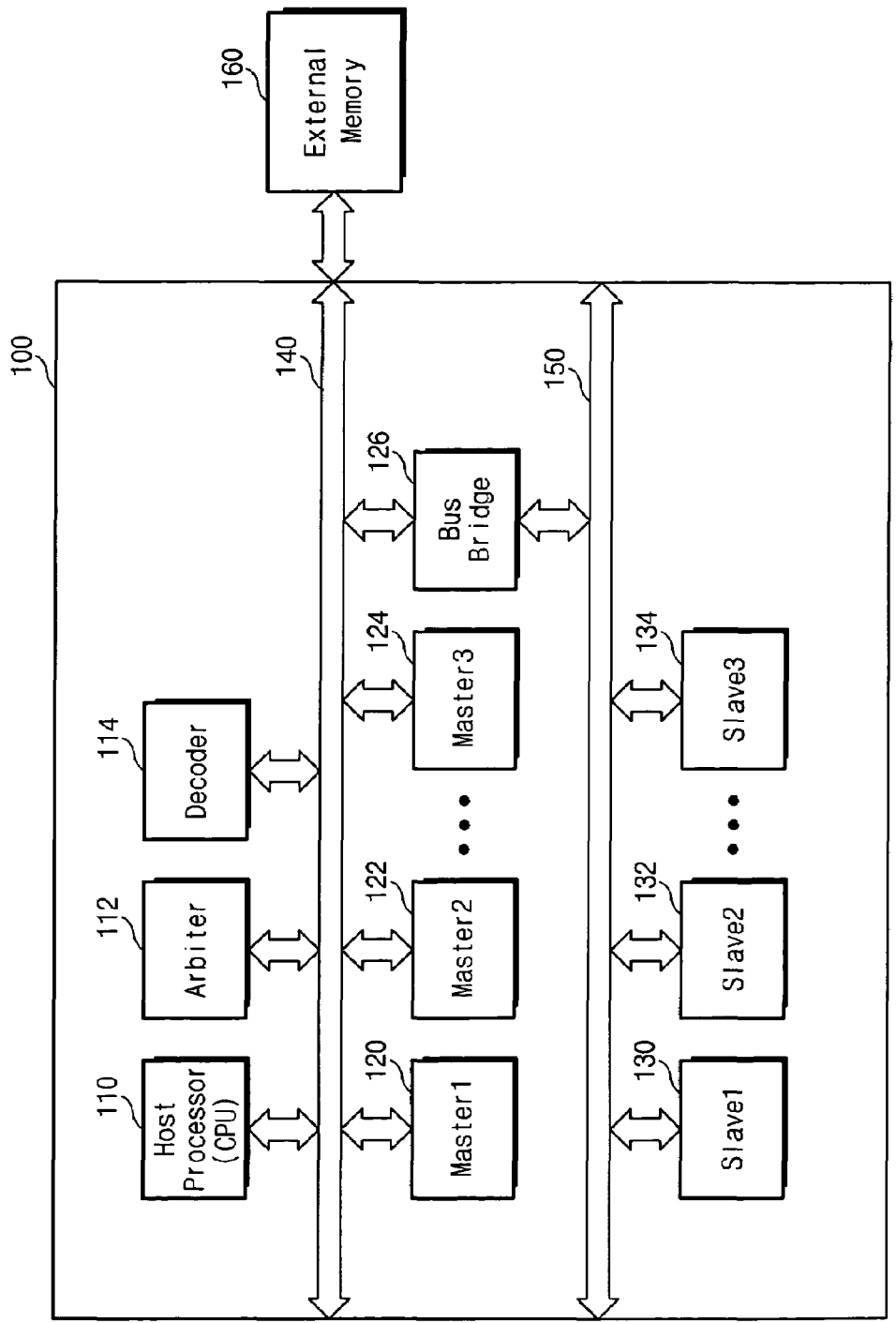
FIG. 1 is a block diagram illustrating a functional structure of a computer system according to an embodiment of the present invention.

FIG. 1 illustrates a functional structure of a computer system according to an embodiment of the present invention. The computer system comprises a SOC 100 and an external memory 160. The SOC 100 comprises a host processor 110, an arbiter 112, a decoder 114, masters 120, 122, and 124 (120~124), a bus bridge 126, slaves 130, 132, and 134 (130~134), and buses 140 and 150. The host processor 110 is, for example, a CPU receiving and decoding a sequence of instructions to conduct various operations in accordance with the instructions. The arbiter 112 monitors bus access requested by the peripheral devices and determines a bus priority order among current bus access, arranging the order of access to the buses 140 and 150. The decoder 114 maps addresses stored in address registers of the masters and slaves to select the masters 120~124 and the slaves 130~134.

The masters 120~124 are data processing devices, each comprising a microprocessor (MCU), a coprocessor such a DSP, and cache memories.

The bus bridge 126 connects the main bus 140 to the extension bus 150. The extension bus 150 is a fast bus extendible to a substantially infinite range by means of a daisy chain pattern. The slaves 130~134 are devices to be added according to the needs of a user, including, for example, a storage extension module, a video control extension module, a multimedia extension module, and a communication extension module. The storage extension module is adaptable to, for example, hard disks, DVDs, and CDs, and the video control extension module is adaptable to LCDs, CRT monitors, and new-generation display devices and the like. The multimedia extension module is adaptable to sound cards, television reception cards, MPEG devices, etc. The communication extension module is adaptable to, for example, networks, modems, and super data-rate communication networks.

Figure 2:
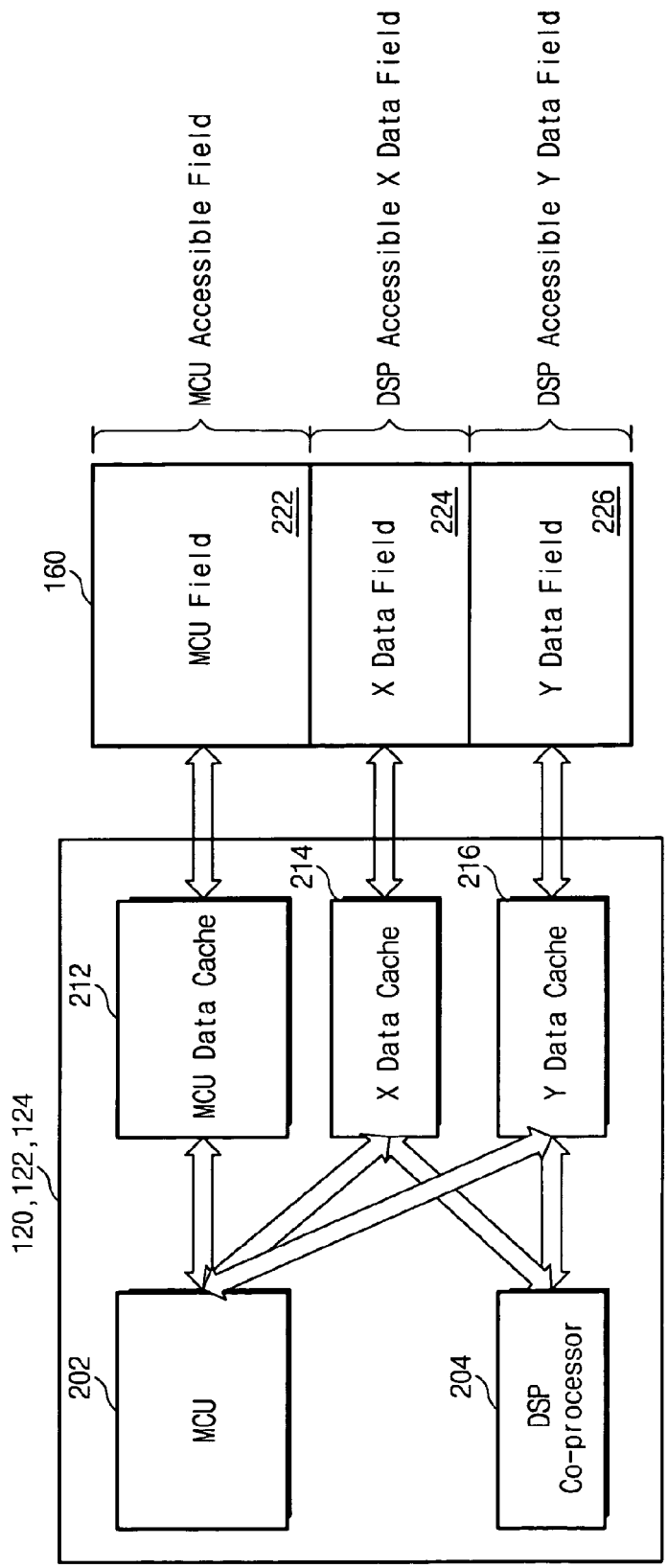
FIG. 2 is a block diagram illustrating functional structures of the masters shown in FIG. 1.

Referring to FIG. 2, the masters 120~124 comprise an MCU 202, a DSP coprocessor 204, an MCU data cache 212, an X-data cache 214, and Y-data cache 216. The MCU 202 carries out arithmetic functions with integers or with floating points, and Boolean operations, and performs address conversion. The MCU 202 comprises an instruction fetch unit (IFU), an instruction execution unit (IEU), and a cache control unit.

The instruction fetch unit fetches an instruction, buffers an instruction deferred by the instruction execution unit, and performs an arithmetic operation with a virtual address to be used for fetching the next instruction. The instruction is fetched from an instruction cache of the cache control unit by the instruction fetch unit. The virtual address for the instruction to be fetched is transferred to the instruction cache by way of interpretation to a physical address.

The instruction execution unit stores and searches data of a data cache provided in the cache control unit. The instruction execution unit converts a virtual data address to a physical address adaptable to the cache control unit, which secures a loading/storing operation to be active in a valid order of program stream. The cache control unit determines whether a request defined by a physical address of data is acceptable to the instruction cache or the data cache. FIG. 2 illustrates an example of a data cache in the cache data unit.

The DSP coprocessor 204 comprises an execution part having at least one arithmetic logic unit (ALU) coupled to a multiplier for executing a mathematically algorithm with pipe-lined. The DSP coprocessor 204 is mainly assigned to conduct mathematical operations, processes multimedia functions such as video, audio, video capture and play-back, telephone communication, voice identification and synthesis, and communication. Such DSP functions are invoked with micro-coded patterns by the host processor (e.g., the CPU 110 of FIG. 1). The micro-coded kernels comprise FIR (finite impulse response) and IIR (infinite impulse response) filters, FFTs (Fourier transforms), correlation functions, matrix multiplication, and Taylor series functions.

The correlation function among the DSP abilities includes X- and Y-vectors. The X-vector is stored in the X-data cache 214 and the Y-vector is stored in the Y-data cache 216. The X- and Y-data caches, 214 and 216, stores predetermined data of an application program without partitioning. The MCU 202 is accessible to the X-data cache 214 and the Y-data cache 216 as well as the MCU data cache 212, wherein an amount of accessible cache available to the MCU is increased.

The external memory 160 is segmented into an MCU field 222, an X-data field 224, and a Y-data field 226. The MCU field 222 is a memory field accessible to/from the MCU data cache 212. The X-data field 224 is a memory field accessible to/from the X-data cache 214. The Y-data field 226 is a memory field accessible to/from the Y-data cache 216.

Figure 3:
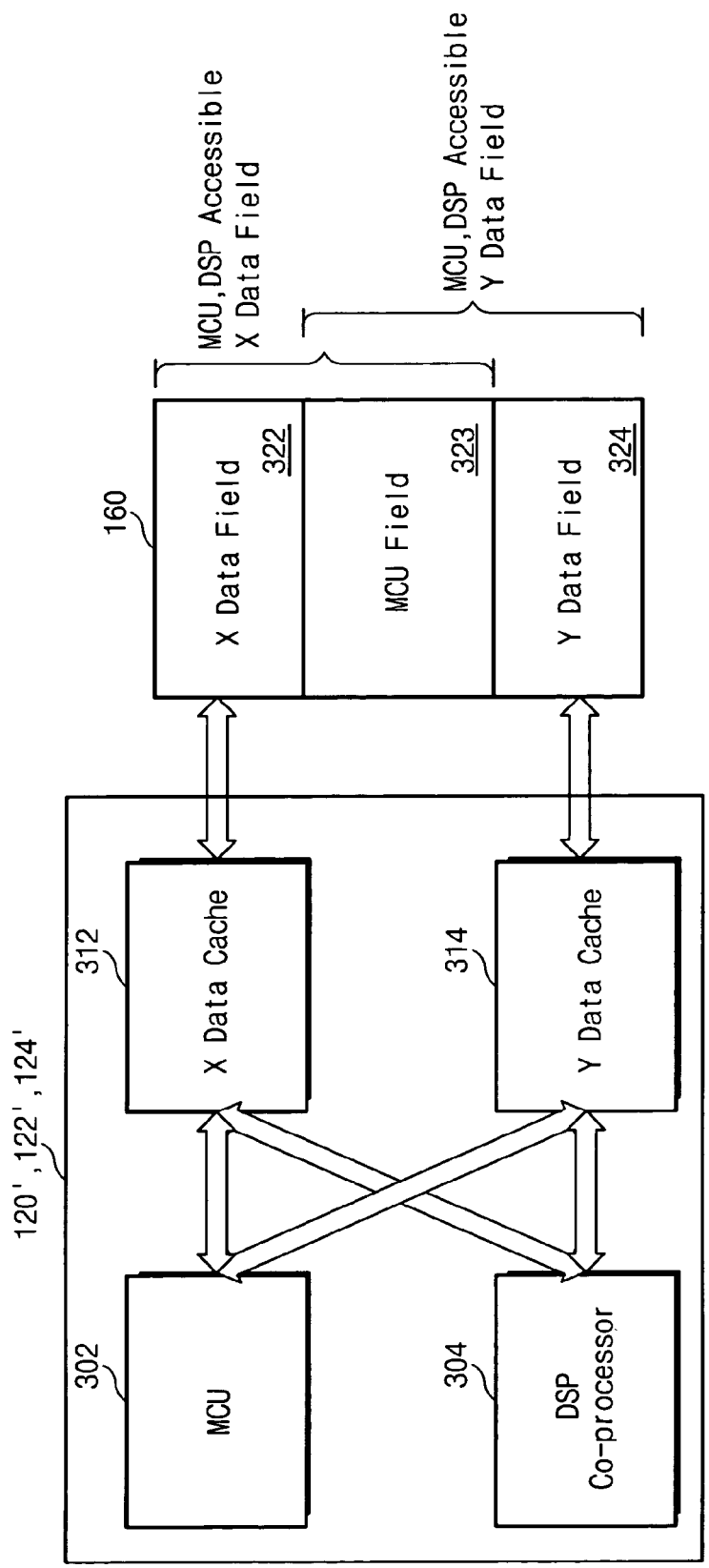
FIG. 3 is a block diagram illustrating other functional structures of the masters shown in FIG. 1.

FIG. 3 illustrates masters 120', 122', and 124' (hereinafter, 122'~124') according to embodiment of the present invention. Referring to FIG. 3, the masters 120'~124' comprises an MCU 302, a DSP coprocessor 304, an X-data cache 312, and a Y-data cache 314. The masters 120'~124' do not include the MCU data cache 212 of FIG. 2.

The MCU 302 performs data transmission to/from the external memory 160 alternatively through the X-data cache 312 and the Y-data cache 314. The external memory 160 comprises an X-data field 322, an MCU field 323, and a Y-data field 324, which are segmented in the external memory 160. The DSP coprocessor 304 also performs data transmission to/from the external memory 160 alternatively through the X-data cache 312 and the Y-data cache 314. The X-data field 322, the MCU field 323, and the Y-data field 324 of the external memory 160 are accessible to the MCU 302 and data cache 314.

The Y-data cache 314 is accessible to the MCU 302 without the MCU data cache 212 of FIG. 2. The MCU 302 accesses an alternative one of the X-data cache 312 and the Y-data cache 314, or both the X- and Y-data caches. For example, if an application program operating in the DSP coprocessor 304 is using the X-data field of the external memory 160, the MCU 302 selects the Y-data cache 314 and accesses the MCU data field 323 and the Y-data field of the external memory 160.

Therefore, the structure of FIG. 3 has a reduced a circuit area because the MCU data cache 212 is not employed therein.

Although preferred embodiments of the present invention have been disclosed for illustrative purposes, those skilled in the art will appreciate that various modifications, additions and substitutions are possible, without departing from the scope and spirit of the invention as described in the accompanying claims. For example, the masters may employ various types of caches, as well as the X- and Y-data caches, in accordance with operational characteristics of the DSP application programs.

What is claimed is:

1. A data processing device comprising:
   a microprocessor for fetching and executing an instruction;
   a coprocessor invoked by the microprocessor for processing data managed by the microprocessor;
   a microprocessor data cache for storing data managed by the microprocessor;
   an X-data cache for storing a first data group managed by the coprocessor of the data managed by the microprocessor; and
   a Y-data cache for storing a second data group managed by the coprocessor of the data managed by the microprocessor.

2. The data processing device of claim 1, wherein the microprocessor conducts arithmetic operations for integers and floating points, and Boolean functions.

3. The data processing device of claim 1, wherein the coprocessor executes a digital signal processor function operable with at least one of video, audio, video capture and play-back, telephone communication, voice identification and synthesis, and multimedia communication.

4. The data processing device of claim 3, wherein the digital signal processor function is micro-coded with at least one of finite impulse response and infinite impulse response filters, a Fourier transform, a correlation function, a matrix multiplication, and a Taylor series function.

5. A data processing device comprising:
a microprocessor for fetching and executing an instruction;
a coprocessor invoked by the microprocessor for processing data managed by the microprocessor;
an X-data cache for storing a first data group managed by the coprocessor of the data managed by the microprocessor; and
a Y-data cache for storing a second data group managed by the coprocessor of the data managed by the microprocessor;
wherein the microprocessor selects an alternative one of the X-data cache and the Y-data cache to store data managed by the microprocessor.

6. The data processing device of claim 5, wherein the microprocessor conducts arithmetic operations for integers and floating points, and Boolean functions.

7. The data processing device of claim 5, wherein the coprocessor executes a digital signal processor function operable with at least one of video, audio, video capture and play-back, telephone communication, voice identification and synthesis, and multimedia communication.

8. The data processing device of claim 7, wherein the digital signal processor function is micro-coded with at least one of finite impulse response and infinite impulse response filters, a Fourier transform, a correlation function, a matrix multiplication, and a Taylor series function.

9. The data processing system of claim 5, further comprising an external memory segmented into an X-data field for storing data of the X-data cache, a Y-data field for storing data of the Y-data cache, and a microprocessor data field accessible to the microprocessor via at least one of the X-data cache and the Y-data cache.

10. A computer system comprising:
a system bus;
a host processor for receiving, decoding, and executing an instruction;
an arbiter for controlling priorities for system bus access;
a data processing unit for performing a digital signal processing operation subject to the host processor; and
an external memory for storing data managed by the data processing unit;
wherein the data processing unit comprises:
a microprocessor for fetching and executing an instruction;
a coprocessor invoked by the microprocessor for processing data managed by the microprocessor;
a microprocessor data cache for storing data managed by the microprocessor;
an X-data cache for storing a first data group managed by the coprocessor of the data managed by the microprocessor; and
a Y-data cache for storing a second data group managed by the coprocessor of the data managed by the microprocessor.

11. The computer system of claim 10, further comprising a slave in accordance with a need of a user.

12. The computer system of claim 11, wherein the slave comprises at least one of a storage extension module, a video control extension module, a multimedia extension module, and a communication extension module.

13. The computer system of claim 11, further comprising a decoder for addressing the data processing unit and the slave.

14. The computer system of claim 10, wherein the external memory comprises: a microprocessor data field for storing data to and/or from the microprocessor data cache; an X-data field for storing to and/or from the X-data cache; and a Y-data field for storing to and/or from the Y-data cache.

15. The data processing device of claim 10, wherein the microprocessor conducts arithmetic operations for integers and floating points, and Boolean functions.

16. The data processing device of claim 10, wherein the coprocessor executes a digital signal processor function operable with at least one of video, audio, video capture and play-back, telephone communication, voice identification and synthesis, and multimedia communication.

17. The data processing device of claim 16, wherein the digital signal processor function is micro-coded with at least one of finite impulse response and infinite impulse response filters, a Fourier transform, a correlation function, a matrix multiplication, and a Taylor series function.

18. A computer system comprising:
a system bus;
a host processor for receiving, decoding, and executing an instruction;
an arbiter for controlling priorities for system bus access;
a data processing unit for performing a digital signal processing operation subject to the host processor; and
an external memory for storing data managed by the data processing units;
wherein the data processing unit comprises:
a microprocessor for fetching and executing an instruction;
a coprocessor invoked by the microprocessor for processing data managed by the microprocessor;
an X-data cache for storing a first data group managed by the coprocessor of the data managed by the microprocessor; and
a Y-data cache for storing a second data group managed by the coprocessor of the data managed by the microprocessor.

19. The computer system of claim 18, further comprising a slave in accordance with a need of a user.

20. The computer system of claim 19, wherein the slave comprises at least one of a storage extension module, a video control extension module, a multimedia extension module, and a communication extension module.

21. The computer system of claim 19, further comprising a decoder for addressing the data processing unit and the slave.

22. The computer system of claim 18, wherein the external memory comprises:
a microprocessor data field for storing data to and/or from the microprocessor via at least one of the X-data cache and the Y-data cache;
an X-data field for storing to and/or from the X-data cache; and
a Y-data field for storing to and/or from the Y-data cache.

23. The data processing device of claim 18, wherein the microprocessor conducts arithmetic operations for integers and floating points, and Boolean functions.

24. The data processing device of claim 18, wherein the coprocessor executes a digital signal processor function operable with at least one of video, audio, video capture and play-back, telephone communication, voice identification and synthesis, and multimedia communication.

25. The data processing device of claim 24, wherein the digital signal processor function is micro-coded with at least one of finite impulse response and infinite impulse response filters, a Fourier transform, a correlation function, a matrix multiplication, and a Taylor series function.

* * * * *